(12) United States Patent
Blount et al.

(10) Patent No.: US 9,575,477 B2
(45) Date of Patent: Feb. 21, 2017

(54) SENSOR INSTALLATION IN A BUILDING MANAGEMENT SYSTEM

(75) Inventors: Marion L. Blount, Mahopac, NY (US); Jeffrey O. Kephart, Cortland Manor, NY (US); Jonathan Lenchner, North Salem, NY (US); Iqbal I. Mohomed, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 956 days.

(21) Appl. No.: 13/562,619

(22) Filed: Jul. 31, 2012

(65) Prior Publication Data

US 2014/0039685 A1 Feb. 6, 2014

(51) Int. Cl.
*G05B 13/00* (2006.01)
*G05B 15/02* (2006.01)
*G08B 25/10* (2006.01)

(52) U.S. Cl.
CPC .............. *G05B 15/02* (2013.01); *G08B 25/10* (2013.01); *G05B 2219/2642* (2013.01)

(58) Field of Classification Search
CPC .................................................... G05B 19/42
USPC ....................................................... 700/276
See application file for complete search history.

(56) References Cited

U.S. PATENT DOCUMENTS

| | | | |
|---|---|---|---|
| 6,385,510 B1 | 5/2002 | Hoog et al. | |
| 7,529,646 B2 | 5/2009 | Lin et al. | |
| 7,593,642 B2 | 9/2009 | Loechner et al. | |
| 7,844,416 B2 | 11/2010 | Braunstein et al. | |
| 2003/0040279 A1* | 2/2003 | Ballweg | ........................ 455/66 |
| 2005/0159911 A1* | 7/2005 | Funk et al. | .................. 702/104 |
| 2005/0197847 A1* | 9/2005 | Smith | .............................. 705/1 |
| 2006/0202834 A1* | 9/2006 | Moriwaki | ................. 340/573.1 |
| 2006/0258292 A1* | 11/2006 | Kato | ..................... G01V 1/008 |
| | | | 455/67.11 |
| 2009/0012633 A1* | 1/2009 | Liu et al. | ........................ 700/90 |

(Continued)

OTHER PUBLICATIONS

Keller, "Buildwise . . . Wireless Sensor Networks for Energy and Environment Management in Buildings," University of London, Department of Computing, Sep. 2008.

(Continued)

*Primary Examiner* — Sean Shechtman
(74) *Attorney, Agent, or Firm* — Ryan, Mason & Lewis, LLP

(57) ABSTRACT

A sensor is installed in a building management system by determining a sensor type of the sensor from among a plurality of supported sensor types based on information collected by a mobile device of a user; identifying configuration information required by the building management system for the determined sensor type; obtaining the required configuration information from the user using an interface on the mobile device, wherein at least a portion of the interface is generated to accommodate one or more requirements of the building management system with respect to the determined sensor type; and providing the obtained required configuration information to the building management system. The sensor type and unique identifier of the sensor can be automatically determined. Portions of the required configuration information for the determined sensor type can be automatically populated using default information for the determined sensor type.

23 Claims, 3 Drawing Sheets

(56) References Cited

U.S. PATENT DOCUMENTS

| | | | | |
|---|---|---|---|---|
| 2010/0128691 | A1* | 5/2010 | McFarland | H04L 12/2803 370/329 |
| 2011/0059698 | A1 | 3/2011 | Huseth et al. | |
| 2011/0276288 | A1* | 11/2011 | Hsieh et al. | 702/60 |
| 2011/0282169 | A1* | 11/2011 | Grudic et al. | 600/324 |
| 2012/0046792 | A1* | 2/2012 | Secor | 700/276 |

OTHER PUBLICATIONS

McIlwraith, "Distributed Error Detection for Wireless Sensor Networks," Imperial College of Science, Technology and Medicine, University of London, Sep. 2006.

Tapia et al., The Design of a Portable Kit of Wireless Sensors for Naturalistic Data Collection, Pervasive 2006, LNCS, vol. 3968, pp. 117-134, Spring, Heidelberg (2006).

Tavares et al., "Analysis of the Performance Improvement of Building Passive Systems by the Use of Automation," Proceedings of Conference: Air Conditioning and the Low Carbon Cooling Challenge, Cumberland Lodge, Windsor, UK, Jul. 2008.

Kim et al., "ViridiScope: Design and Implementation of a Fine Grained Power Monitoring system for Homes," UbiComp, Orlando, Florida (2009).

\* cited by examiner

200

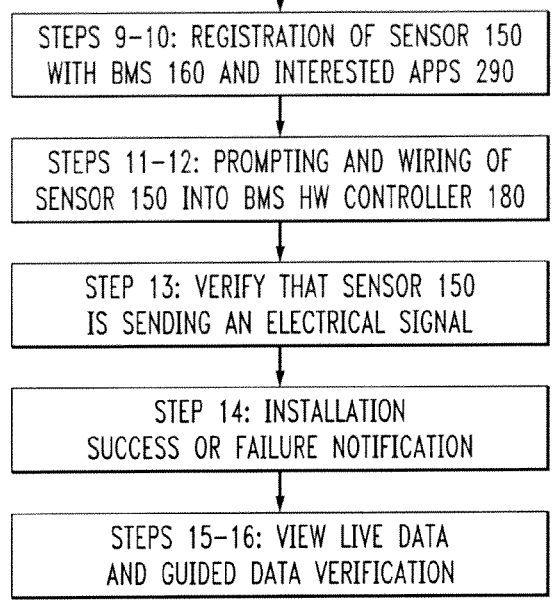
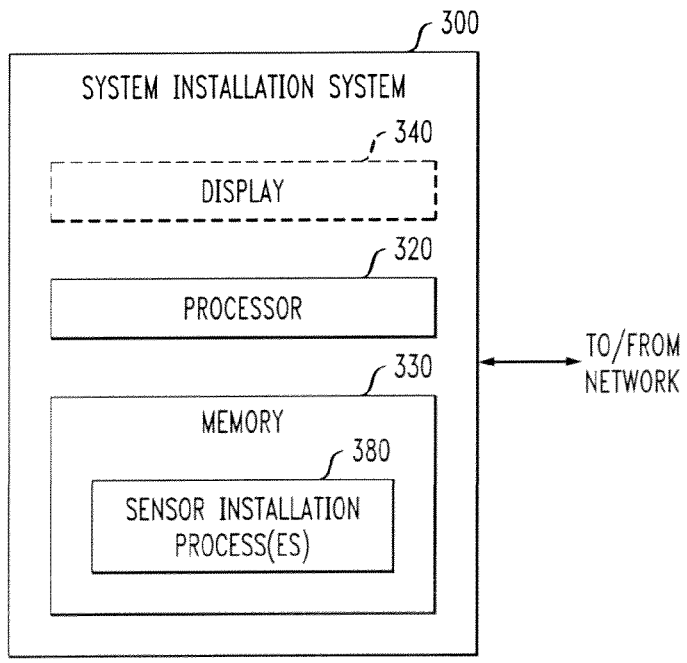

SENSOR INSTALLATION IN A BUILDING MANAGEMENT SYSTEM

FIELD OF THE INVENTION

The present invention relates to techniques for installing sensors in a building management system.

BACKGROUND OF THE INVENTION

Building management systems (BMSs) are computer-based control systems that are installed in buildings to monitor and manage environmental conditions and/or the equipment in the building, such as mechanical and electrical equipment (e.g., lighting, power, ventilation and alarm systems). For example, the building management system may control the heating and cooling of a building, and the distribution of air throughout the building.

A building management system is typically comprised of a centralized BMS controller, as well as a plurality of sensors distributed throughout the building. The installation of the sensors typically requires a technician to make a number of trips back and forth between the area where the sensor is being installed and the location of the BMS controller, to install and configure the sensor and to verify that the sensor was successfully installed and is correctly reporting data. In addition, the installation of a single sensor may require coordination among multiple technicians as several systems must be directly configured to work with the new sensor (e.g., BMS hardware, BMS software and possibly other software or hardware directly interfacing with the sensor).

A need therefore exists for more efficient and accurate techniques for installing a sensor in a building management system.

SUMMARY OF THE INVENTION

Generally, methods and apparatus are provided for installing a sensor in a building management system. According to one aspect of the invention, a sensor is installed in a building management system by determining a sensor type of the sensor from among a plurality of supported sensor types based on information collected by a mobile device of a user; identifying configuration information required by the building management system for the determined sensor type; obtaining the required configuration information from the user using an interface on the mobile device, wherein at least a portion of the interface is generated to accommodate one or more requirements of the building management system with respect to the determined sensor type; and providing the obtained required configuration information to the building management system.

According to further aspects of the invention, some of the required configuration information for the determined sensor type can be automatically populated using default information for the determined sensor type. In addition, the user can optionally be prompted to connect the sensor to the building management system.

Another aspect of the invention provides a sensor installation and verification software application. The sensor installation and verification software application is optionally installed on a smart phone. In addition, the sensor installation and verification software application optionally communicates with the building management system.

A more complete understanding of the present invention, as well as further features and advantages of the present invention, will be obtained by reference to the following detailed description and drawings.

BRIEF DESCRIPTION OF THE DRAWINGS

FIGS. 2A and 2B, collectively, are a flow chart describing an exemplary implementation of a sensor installation process incorporating aspects of the present invention; and FIG. 3 is a block diagram of a sensor installation system that can implement the processes of the present invention.

DETAILED DESCRIPTION OF PREFERRED EMBODIMENTS

The present invention provides more efficient and accurate methods and apparatus for installing a sensor in a building management system. The present invention recognizes that buildings often have a number of different systems (e.g., electrical, security, HVAC, and building management software), each with different individuals responsible for individual components, as well as various types of sensors. The installation of a sensor requires diverse skillsets and expertise, and typically involves physical installation tasks (e.g., installing the physical sensor and connecting wires for data and electricity), configuration tasks in software (potentially involving more than one software system) and verification and/or troubleshooting.

According to one aspect of the invention, a sensor installation and verification (SIV) software application is provided that can communicate with and configure a plurality of different sensor types by stepping a technician through the physical and logical sensor installation processes. In addition, the SIV software application includes information about the building management system (BMS) configuration. In this manner, the SIV software application can perform sensor configuration, registration and verification with the BMS.

As discussed hereinafter, a technician can utilize the SIV software application to enter logical information about the sensor into the BMS. The SIV software application also optionally sends the entered information (along with other collected and/or configured information) to any other applications that may have registered an interest in knowing about sensor installations of the given type. The SIV software application allows sensors to be installed and verified without requiring the technician to go back-and-forth between the installation location, the physical BMS, the BMS software terminal and other areas.

Figure 1:
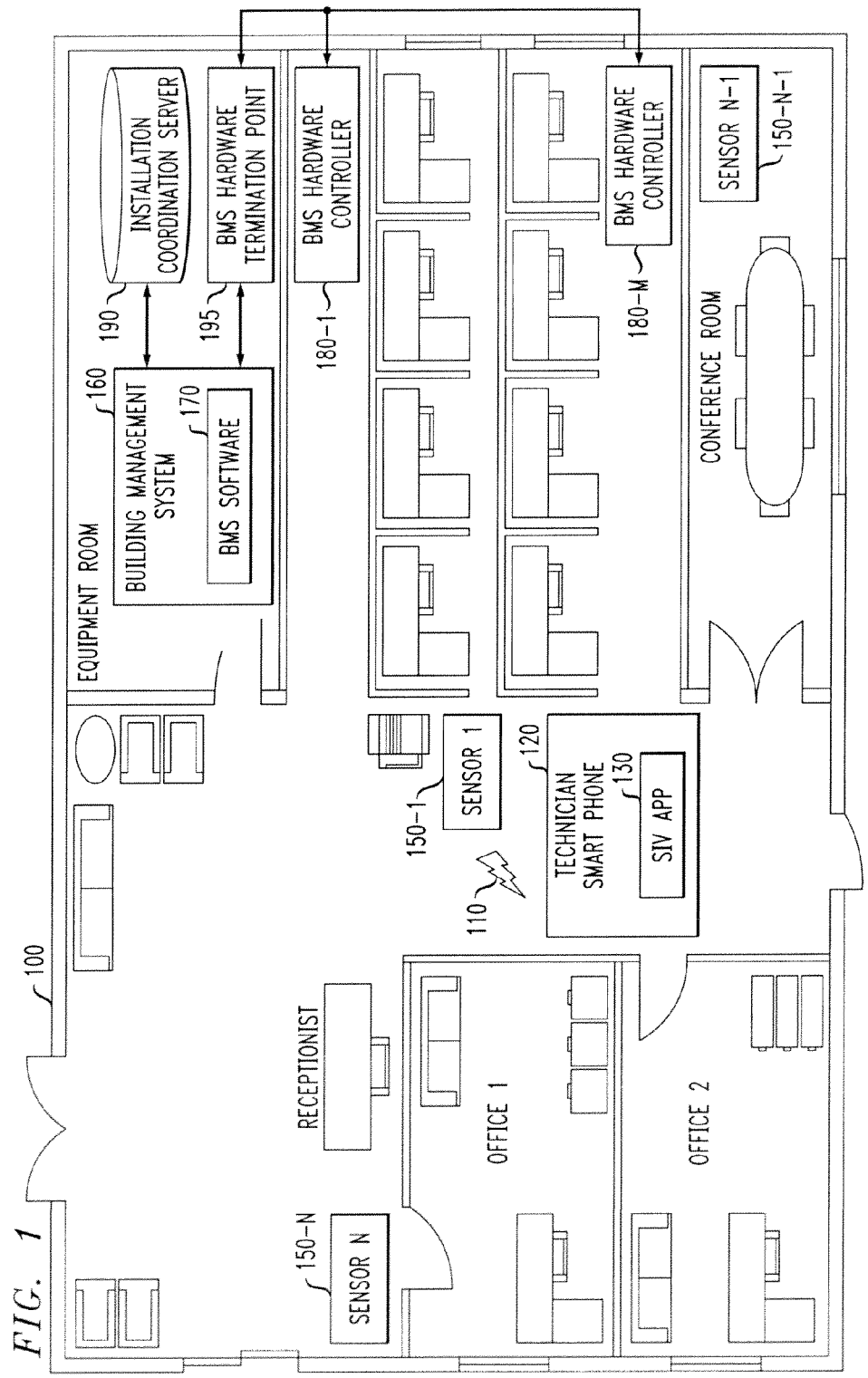
FIG. 1 illustrates an exemplary indoor environment in which the present invention can be employed.

FIG. 1 illustrates an exemplary indoor environment 100, such as an office, where the present invention can be employed. The term "building," as used herein, is intended to refer to a variety of facilities, including, but not limited to, offices, data centers, manufacturing facilities, industrial office space, and residential buildings. While the present invention is illustrated in the context of an exemplary office building, the present invention can be employed in any environment where sensors are deployed to integrate with a building management system.

The exemplary indoor environment 100 of FIG. 1 comprises a lobby (reception area), a number of offices, an equipment room and a conference room. The exemplary indoor environment 100 comprises a number of sensors 150-1 through 150-N distributed throughout the indoor environment 100 for monitoring and/or managing one or more environmental conditions and/or equipment and other devices in the building. In addition, a building management system (BMS) 160 and an installation coordination server 190 are located, for example, in an equipment room.

A technician (not shown) employs a smart phone 120 to install one or more sensors 150, such as an exemplary sensor 150-1. The exemplary smart phone 120 has an installed sensor installation and verification (SIV) software application (app) 130. In another variation, the sensor installation and verification software application 130 is installed on a different device and the smart phone 120 is capable of sending information to, and receiving information from, the sensor installation and verification software application 130. The smart phone 120 communicates with the building management software 170 via the SIV software application 130, for example, using a wireless connection 110. In one exemplary embodiment, each sensor 150 is uniquely identified, for example, using a scannable identifier, such as an attached barcode (not shown) or a radio frequency identification (RFID) tag.

As shown in FIG. 1, and as discussed further below in conjunction with FIGS. 2A and 2B, the building management system 160 comprises BMS software 170, one or more BMS hardware controllers 180-1 through 180-M typically distributed around the building 100 (for example, mounted on one or more walls of the building 100), and a BMS hardware termination point 195 that the BMS hardware controllers 180 are wired into. The BMS hardware termination point 195 can be positioned in an exemplary equipment room, or anywhere in the building 100, or remotely, such as on a cloud. Generally, the sensors 150 get wired into the BMS hardware controllers 180, in a known manner. There are typically a number of BMS hardware controllers 180 for a given building, or even for a given floor of a given building.

The functionality of the sensor installation and verification software application 130, the BMS software 170, and the installation coordination server 190, is as discussed further below in conjunction with FIGS. 2A and 2B. Generally, the sensor installation and verification software application 130 executes on the smart phone 120 (or communicates with the smart phone 120) and communicates with the installation coordination server 190. The SIV software application 130 communicates with and configures a plurality of different types of sensors 150 by stepping a technician through the physical and logical sensor installation processes. The SIV software application 130 performs sensor installation and registration with the BMS 160 and optionally with any other applications that have registered an interest in the particular sensor type. In addition, the SIV software application 130 can optionally also perform one or more of the following support functions: tracking progress and current status of a sensor installation; listing points-of-contact for various subsystems; notifying stakeholders of sensor information; providing facilities to calibrate installed sensors; and supporting detailed logging of the activities performed during installation.

The BMS software 170 provides a limited user interface (UI) for associating sensors with the BMS hardware controllers 180, and for verifying that the BMS hardware controllers 180 are receiving data from the sensors 150.

The installation coordination server 190 maintains a list of fields that need to be filled out for the installation of different types of sensors (e.g., temperature sensors and motion sensors). The list of fields may be BMS-dependent. The installation coordination server 190 optionally also maintains a list of possible default values for these fields, input types, and bounds on allowable values (which may be BMS-dependent). Once filled out, the installation coordination server 190 also maintains a repository of deployed sensors and associated data. The installation coordination server 190 sends the data to the BMS 160 and optionally to other applications registering a need to know about the sensors 150. The installation coordination server 190 optionally also maintains a list of BMS hardware controllers 180 and their locations within one or more buildings so technicians can query this information and are not required to memorize this information.

In one exemplary embodiment, discussed further below in conjunction with FIG. 2A, a barcode generation application generates a unique barcode for each sensor 150. The barcode generation application may optionally be part of the sensor installation and verification software application 130.

Figure 2A:
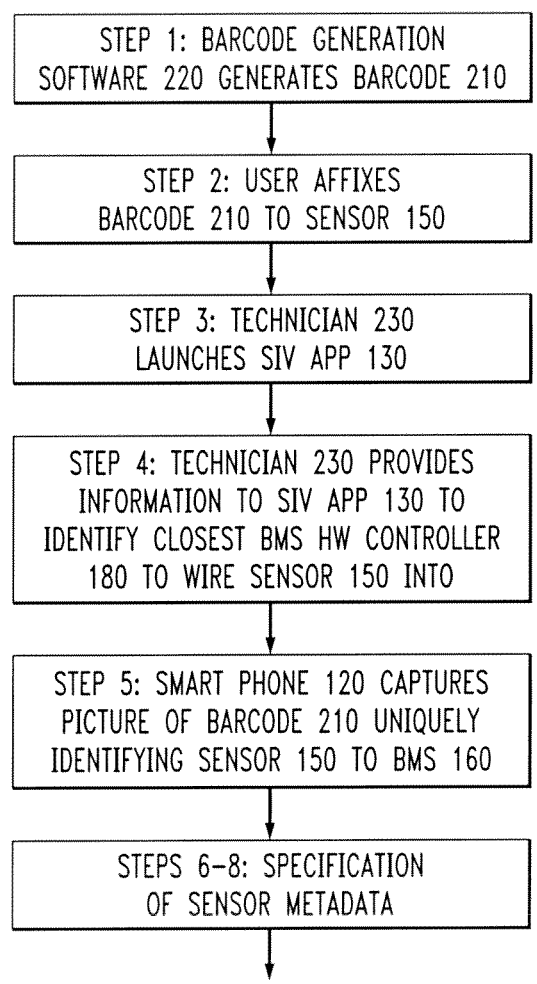

FIGS. 2A and 2B, collectively, are a flow chart describing an exemplary implementation of a sensor installation process 200 incorporating aspects of the present invention. As discussed hereinafter, various functions of the sensor installation process 200 are performed by the sensor installation and verification software application 130, the BMS software 170, the installation coordination server 190 and other entities.

As shown in FIG. 2A, the exemplary sensor installation process 200 begins during step 1 with the sensor installation and verification software application 130 or a dedicated barcode generation application 220 generating one or more barcodes 210. For example, a technician 230 can generate the barcodes 210 prior to leaving to install a set of sensors 150. The barcode 210 is a unique identifier (at least within the environment of a given building management system 160). The barcode 210 should be unique for a given BMS installation (i.e., no two sensors 150 known to the same BMS 160 should have the same barcode). The identifiers can be, for example, sequential, non-repeating integers.

During step 2, a technician 230 installing a sensor 150 applies a barcode 210 to the sensor 150. During step 3, the technician 230 initiates the sensor installation and verification software application 130, selecting, for example, an option to "Install a new Sensor."

The technician 230 is prompted during step 4 to identify, for example, the building, floor and other relevant information regarding where the installation is taking place in sufficient detail to allow the sensor installation and verification software application 130 to determine the closest BMS hardware controller 180 for the technician to connect to.

The sensor installation and verification software application 130 prompts the technician during step 5 to take a picture of the barcode 210, for example, using the smart phone 120. Once the picture is taken, the application 130 can determine the unique identifier of the sensor 150 being installed. If the sensor installation and verification software application 130 is not running on a device 120 that has a camera, then the technician 230 can enter the identifier.

During step 6, the sensor installation and verification software application 130 prompts the technician 230 to specify the type of sensor 150 being installed. This information may be specified, for example, by means of a drop-down list populated with supported sensor types for the given BMS 160. In one implementation, the sensor type could be populated automatically, with the aid of computer-vision, if the technician 230 takes a picture of the sensor 150, and the sensor type is recognized from the image, or if the unique identifier obtained in step 5 also encodes the sensor type.

Once the sensor installation and verification software application 130 identifies the type of sensor 150 being installed, the sensor installation and verification software application 130 communicates during step 7 with the installation coordination server 190 to obtain a list of all required fields that need to be filled out by the technician 230 for that particular sensor type and its associated BMS 160.

During step 8, the technician 230 is presented with a set of fields that need to be filled out or verified. If a given field can be filled out automatically (such as location of sensor, name of technician (by virtue of log-in), time of day), this is optionally done by the sensor installation and verification software application 130. For the location, the sensor installation and verification software application 130 can optionally present a map of the building, and given that the sensor installation and verification software application 130 already knows the region of the building where the installation is taking place (for example, by virtue of step 4), the technician 230 can further click on a precise location in the map for a more precise indication of the location. Further, such fields may be available for review and modification by the technician 230. For some fields, the default values may be specified by the installation coordination server 190.

Once the necessary information is completed, the entered information is relayed to the installation coordination server 190 during step 9 (FIG. 2B).

The installation coordination server 190 uses the provided information, along with existing default values, during step 10, to communicate with the building management system 160 and any third-party software 290 (e.g., OSIsoft's PI System™—an enterprise infrastructure for managing sensed data and events) that needs to be made aware of the sensor 150 being installed without requiring the technician 230 to have to log in and enter information separately into these various systems. Communication between the installation coordination server 190 and the BMS 160 or third-party software 290 will typically occur using well-defined application programming interfaces (APIs). In cases where such a well-defined API does not exist, the installation coordination server 190 can make use of screen-scraping and automation technology to operate the user interface of the BMS 160 or third-party software.

During step 11, the technician 230 is prompted to install the sensor 150 and connect it to the BMS hardware controller 180.

The technician 230 connects the sensor 150 to the BMS hardware controller 180 during step 12. During step 13, the technician 230 is optionally prompted to verify that an electrical signal is being sent from the sensor 150 to the BMS hardware controller 180, for example, using a current clamp or another electronic device.

If the BMS hardware controller 180 receives successful confirmation that the new sensor 150 has been installed during step 14 (from the BMS 160 and each application that has registered an interest in this sensor type), the BMS hardware controller 180 relays this confirmation to the sensor installation and verification software application 130 on the smart phone 120. If a failure is encountered, the installation coordination server 190 can automatically and immediately notify any responsible parties, as identified on system setup (such as responsible parties identified for the building as a whole, or for sensor installation of a given type) of the condition (e.g., via a page based on a pager schedule). Further, the installation coordination server 190 can provide diagnostic information to the sensor installation and verification software application 130, which can then be presented to the technician 230, as well as to any responsible parties.

In the case of a successful installation of the sensor 150, the technician 230 may be shown the live data collected by the sensor 150 during step 15.

The sensor installation and verification software application 130 optionally supports a guided verification procedure during step 16, where a technician 230 is instructed to perform a set of tests that verify correctness of the data reported by the sensor 150. In this case, the technician 230 initiates a test and potentially applies a stimulus (e.g., in the case of a motion detector, the sensor installation and verification software application 130 may instruct the technician 230 to have the room empty for two minutes followed by moving around the room for two minutes). The technician 230 or the installation coordination server 190 can monitor the sensor data stream to verify that expected sensor readings are observed. In the case of faulty sensor readings, the sensor installation and verification software application 130 can inform the technician 230 and/or some other responsible party of the result.

While FIGS. 2A and 2B show an exemplary sequence of steps, it is also an embodiment of the present invention that these sequences may be varied. Various permutations of the algorithms are contemplated as alternate embodiments of the invention.

While exemplary embodiments of the present invention have been described with respect to processing steps in a software program, as would be apparent to one skilled in the art, various functions may be implemented in the digital domain as processing steps in a software program, in hardware by a programmed general-purpose computer, circuit elements or state machines, or in combination of both software and hardware. Such software may be employed in, for example, a hardware device, such as a digital signal processor, application specific integrated circuit, micro-controller, or general-purpose computer. Such hardware and software may be embodied within circuits implemented within an integrated circuit.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 3 is a block diagram of a sensor installation system 300 that can implement the processes of the present invention. As shown in FIG. 3, memory 330 configures the processor 320 to implement the sensor installation methods, steps, and functions disclosed herein (collectively, shown as 380 in FIG. 3). The memory 330 could be distributed or local and the processor 320 could be distributed or singular. The memory 330 could be implemented as an electrical, magnetic or optical memory, or any combination of these or other types of storage devices. It should be noted that each distributed processor that makes up processor 320 generally contains its own addressable memory space. It should also be noted that some or all of computer system 300 can be incorporated into a personal computer, laptop computer, handheld computing device, application-specific circuit or general-use integrated circuit.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the embodiments and variations shown and described herein are merely illustrative of the principles of this invention and that various modifications may be implemented by those skilled in the art without departing from the scope and spirit of the invention.

What is claimed is:

1. A method for installing a sensor in a building management system, comprising the steps of:
    identifying, during said installation of said sensor, a building management hardware system controller to connect the sensor to by identifying a closest building management system hardware controller in an area where said sensor is being installed;
    automatically determining a sensor type of said sensor from among a plurality of supported sensor types by analyzing image information collected by using a software installation and verification application on a mobile device of a user, wherein the image information collected comprises one or more of an image of the sensor and a unique identifier;
    identifying configuration information required by said building management system for said determined sensor type;
    obtaining, during said installation of said sensor, said required configuration information from said user using an interface on said mobile device, wherein at least a portion of said interface is generated to accommodate one or more requirements of said building management system with respect to said determined sensor type;

providing said obtained required configuration information to said building management system for said installing and a verification of the installed sensor; and providing a guided verification procedure to perform a set of tests that verify correctness of data reported by the installed sensor.

2. The method of claim 1, further comprising the step of determining said building management system from among a plurality of supported building management systems.

3. The method of claim 1, further comprising the step of presenting one or more instructions to said user on said mobile device based on the requirements of said building management system with respect to said determined sensor type.

4. The method of claim 1, wherein said step of automatically determining a sensor type of said sensor further comprises the step of performing visual recognition based on a photograph of said sensor obtained by said mobile device.

5. The method of claim 1, further comprising the step of obtaining said unique identifier of said sensor using said mobile device of said user.

6. The method of claim 5, wherein said step of automatically determining a sensor type for said sensor further comprises the step of scanning a scannable identifier using said mobile device.

7. The method of claim 1, further comprising the step of automatically populating at least some of said required configuration information for said determined sensor type using default information for said determined sensor type.

8. The method of claim 1, further comprising the step of prompting said user on said mobile device to connect said sensor to said building management system.

9. The method of claim 1, wherein one or more of said steps are performed by a sensor installation and verification software application.

10. The method of claim 9, wherein said sensor installation and verification software application is installed on said mobile device.

11. The method of claim 9, wherein said sensor installation and verification software application communicates with said building management system.

12. The method of claim 1, further comprising the step of verifying an operation of said sensor.

13. The method of claim 12, wherein said step of verifying an operation of said sensor further comprises the step of evaluating data received from said sensor.

14. An apparatus for installing a sensor in a building management system, the apparatus comprising:

a memory; and at least one hardware device, coupled to the memory, operative to:

identify, during said installation of said sensor, a building management hardware system controller to connect the sensor to by identifying a closest building management system hardware controller in an area where said sensor is being installed;

automatically determine a sensor type of said sensor from among a plurality of supported sensor types by analyzing image information collected by using a software installation and verification application on a mobile device of a user, wherein the image information collected comprises one or more of an image of the sensor and a unique identifier;

identify configuration information required by said building management system for said determined sensor type;

obtain, during said installation of said sensor, said required configuration information from said user using an interface on said mobile device, wherein at least a portion of said interface is generated to accommodate one or more requirements of said building management system with respect to said determined sensor type;

provide said obtained required configuration information to said building management system for said installing and a verification of the installed sensor; and provide a guided verification procedure to perform a set of tests that verify correctness of data reported by the installed sensor.

15. The apparatus of claim 14, wherein said at least one hardware device is further configured to obtain said unique identifier of said sensor using said mobile device of said user.

16. The apparatus of claim 14, wherein said at least one hardware device is further configured to determine said building management system from among a plurality of supported building management systems.

17. The apparatus of claim 14, wherein said at least one hardware device is further configured to present one or more instructions to said user on said mobile device based on the requirements of said building management system with respect to said determined sensor type.

18. The apparatus of claim 14, wherein said sensor type is automatically determined by performing visual recognition based on a photograph of said sensor obtained by said mobile device.

19. The apparatus of claim 15, wherein said unique identifier for said sensor is automatically determined by scanning a scannable identifier using said mobile device.

20. The apparatus of claim 14, wherein said at least one hardware device is further configured to automatically populate at least some of said required configuration information for said determined sensor type using default information for said determined sensor type.

21. The apparatus of claim 14, wherein one or more of said steps are performed by a sensor installation and verification software application installed on said mobile device.

22. The apparatus of claim 14, wherein said at least one hardware device is further configured to verify an operation of said sensor.

23. An article of manufacture for installing a sensor in a building management system, comprising a non-transitory machine readable recordable medium containing one or more programs which when executed implement the steps of:

identifying, during said installation of said sensor, a building management hardware system controller to connect the sensor to by identifying a closest building management system hardware controller in an area where said sensor is being installed;

automatically determining a sensor type of said sensor from among a plurality of supported sensor types by analyzing image information collected by using a software installation and verification application on a mobile device of a user, wherein the image information collected comprises one or more of an image of the sensor and a unique identifier;

identifying configuration information required by said building management system for said determined sensor type;

obtaining, during said installation of said sensor, said required configuration information from said user using an interface on said mobile device, wherein at least a portion of said interface is generated to accommodate one or more requirements of said building management system with respect to said determined sensor type;

providing said obtained required configuration information to said building management system for said installing and verification of the installed sensor; and providing a guided verification procedure to perform a set of tests that verify correctness of data reported by the installed sensor.

\* \* \* \* \*